United States Patent
Love

[11] 4,072,399
[45] Feb. 7, 1978

[54] PASSIVE OPTICAL COUPLER

[75] Inventor: Roy E. Love, Corning, N.Y.

[73] Assignee: Corning Glass Works, Corning, N.Y.

[21] Appl. No.: 376,573

[22] Filed: July 5, 1973

[51] Int. Cl.² ............................................. G02B 5/14
[52] U.S. Cl. .................................. 350/96.16; 250/199
[58] Field of Search ............ 350/96 R, 96 B, 96 WG, 350/169–174, 96 C; 250/199

[56] References Cited
U.S. PATENT DOCUMENTS

| | | | |
|---|---|---|---|
| 3,453,036 | 7/1969 | Swope et al. | 350/96 B |
| 3,455,625 | 7/1969 | Brumley et al. | 350/169 X |
| 3,756,688 | 9/1973 | Hudson et al. | 350/96 WG |

Primary Examiner—F. L. Evans
Attorney, Agent, or Firm—William J. Simmons, Jr.; Walter S. Zebrowski; Clarence R. Patty, Jr.

[57] ABSTRACT

A coupler disposed between two optical signal transmission lines for extracting from the first transmission line a fraction of the energy transmitted thereby and for injecting an input optical signal into the other transmission line. The first transmission line is coupled to the input of a first mixer rod, the output end of which is connected to the input end of a second mixer rod by a first optical waveguide bundle. A second optical waveguide bundle, which is also connected to the output of the first mixer rod extracts a portion of the energy at the output end of the first mixer rod and couples it to output means. An input optical signal is coupled by a third optical waveguide bundle to the input end of the second mixer rod, the output end of which is coupled to the second transmission line.

7 Claims, 5 Drawing Figures

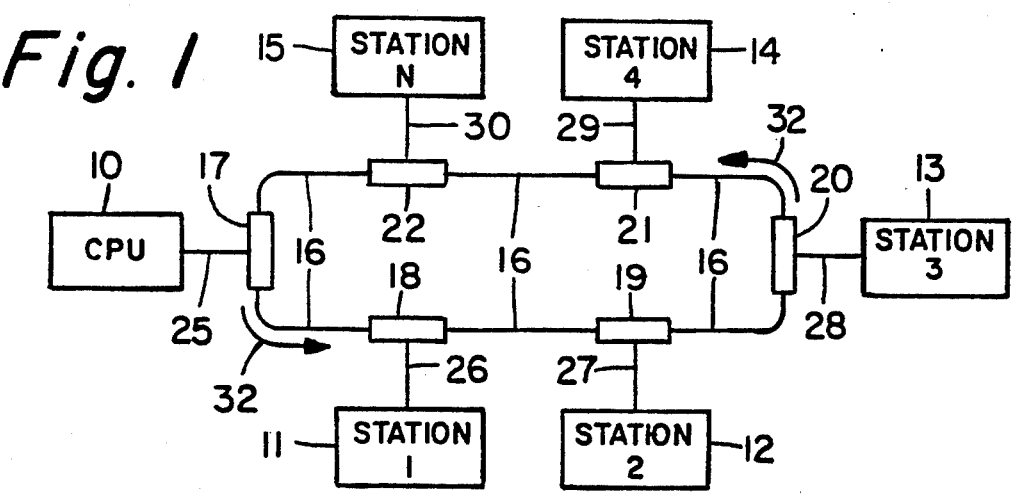
Fig. 1
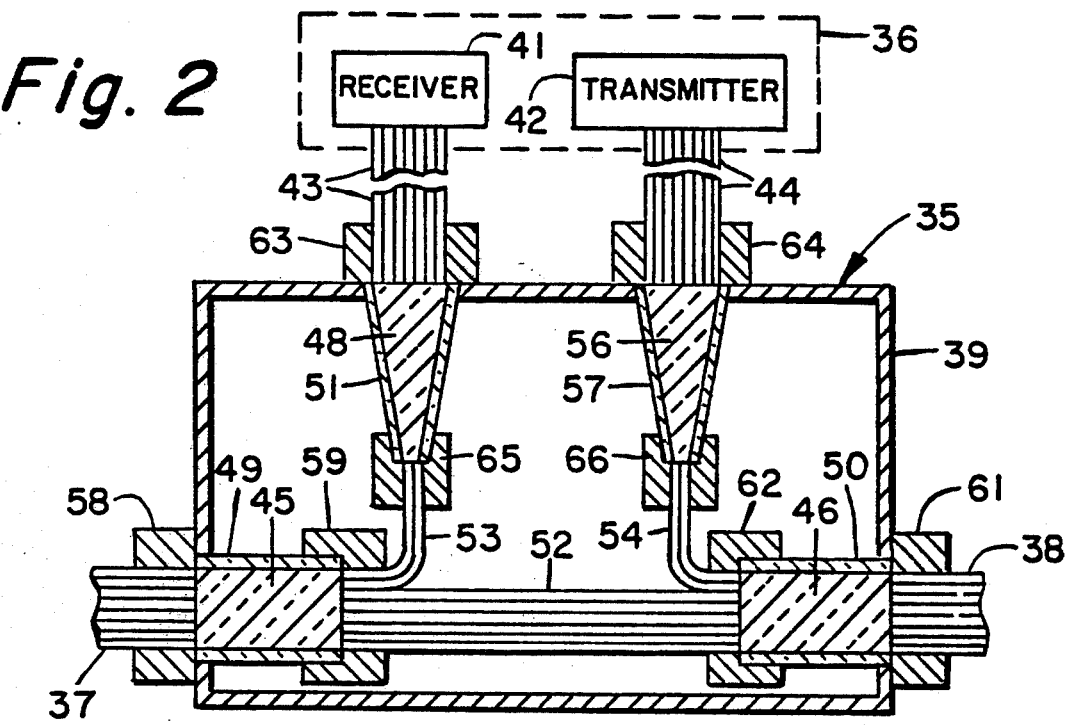
Fig. 2
Fig. 3
Fig. 4

PASSIVE OPTICAL COUPLER

BACKGROUND OF THE INVENTION

The continually increasing amount of traffic that communications systems are required to handle has hastened the development of high capacity systems. Even with the increased capacity made available by systems operating between $10^9$ Hz and $10^{12}$ Hz, traffic growth is so rapid that saturation of such systems is anticipated in the very near future. High capacity communication systems operating around $10^{15}$ Hz are needed to accommodate future increases in traffic. These systems are referred to as optical communication systems since $10^{15}$ Hz is within the frequency spectrum of light. Conventional electrically conductive waveguides which have been employed at frequencies between $10^9$ and $10^{12}$ Hz are not satisfactory for transmitting information at carrier frequencies around $10^{15}$ Hz.

The transmitting media required in the transmission of frequencies around $10^{15}$ Hz are hereinafter referred to as optical signal transmission lines which may consist of a single optical waveguide or a bundle thereof. Optical waveguides normally consist of an optical fiber having a transparent core surrounded by a layer of transparent cladding material having a refractive index which is lower than that of the core. Although the theory of optical waveguides has been known for some time, practical optical waveguides that do not absorb an excessive amount of transmitted light have been developed only recently. U.S. Pat. No. 3,659,915 discloses a low loss optical waveguide comprising a cladding layer of fused silica and a core of fused silica doped with one or more materials that selectively increase the index of refraction of the core above that of the cladding.

To establish between a plurality of stations an optical communication network, i.e., one employing optical signal transmission lines, a variety of interconnection schemes may be utilized. Each station can be "hard wired" to every other station, but when many stations must be interconnected, the excessive amount of optical signal transmission line required causes this method to be undesirable due to both the cost of the transmission line and the space consumed thereby. The stations may be interconnected by a loop or line data bus which drastically reduces the required amount of optical signal transmission line. A loop data bus can be used, for example, to interconnect a plurality of stations, one of which is generally a central processing unit. This type of transmission path has no end, and data, in principle, could circulate around the path many times. In practice, attenuation is large enough that the data is not detectable after one circuit of the loop. Transmission in the loop can be unidirectional, i.e., each station transmits in one direction only, or it may be bidirectional, depending upon the type of coupler used at each station.

Each station requires a coupler for extracting from the transmission line a fraction of the optical signal propagating therein and for injecting onto the transmission line an optical signal of sufficient strength that it is detectable at each of the remaining stations.

SUMMARY OF THE INVENTION

It is therefore an object of the present invention to provide a passive optical coupler for extracting a fraction of an optical signal propagating in an optical signal transmission line and for injecting an input optical signal onto the transmission line.

Briefly, the coupler of the present invention comprises first and second light mixers, each having an input portion for receiving light and an output portion across which light received by the input portion is relatively evenly distributed. The input portion of the first mixer is adapted to be connected to an end of a first transmission line, and the output portion of the second mixer is adapted to be connected to an end of a second transmission line. First coupling means is provided for coupling most of the light at the output portion of the first mixer to the input portion of the second mixer, the remaining light available at the output portion of the first mixer constituting an output optical signal. Second coupling means is disposed adjacent to the output portion of the first mixer for coupling the output optical signal to output means. Third coupling means are provided for coupling an input optical signal provided by input means to the input portion of the second mixer.

BRIEF DESCRIPTION OF THE DRAWINGS

FIG. 1 is a schematic illustration in block diagram form of a loop data.

FIG. 2 is a cross-sectional view of a preferred embodiment of the present invention.

FIGS. 3, 4 and 5 are cross-sectional views of modifications of the embodiment of FIG. 2.

DESCRIPTION OF THE PREFERRED EMBODIMENTS

Figure 5:
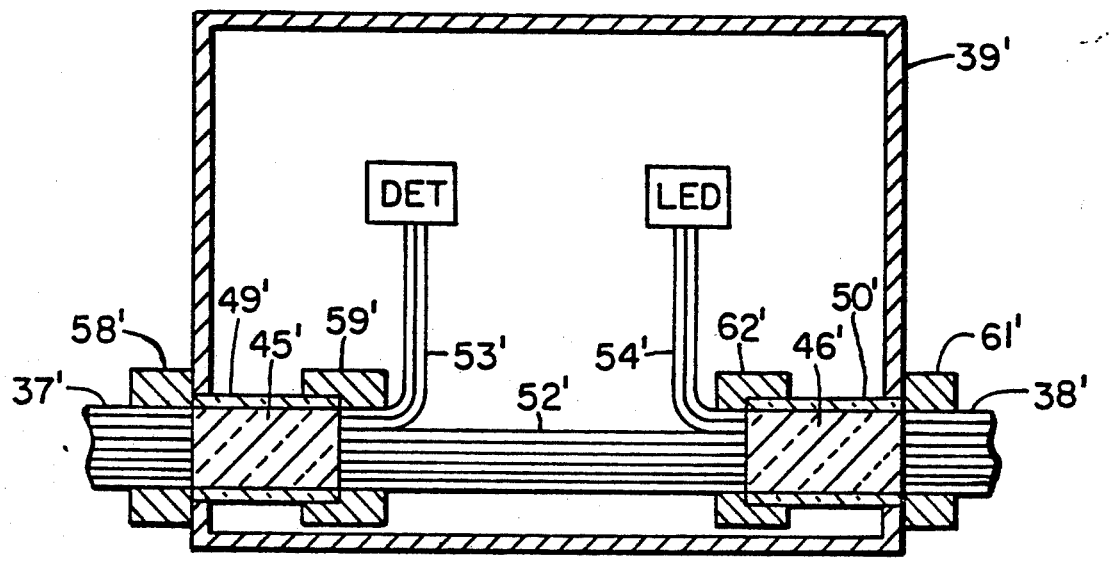

FIG. 1 is a schematic illustration in block diagram form of a loop data bus wherein a central processing unit 10 and a plurality of stations 11 through 15 are interconnected by an optical transmission line 16. Couplers 17 through 22, which are disposed between sections of transmission line 16, are utilized for injecting optical signals into and extracting optical signals from the transmission line. Lines 25 through 30 are indicative of one or more auxiliary transmissions lines which interconnect each of the couplers to its associated station. In communication systems of the type illustrated in FIG. 1 optical signals generally travel in one direction as indicated by arrows 32.

Couplers 17 through 22 may be of the type illustrated in FIG. 2 which is a preferred embodiment of the present invention. Coupler 35 is utilized for connecting station 36 to sections 37 and 38 of optical signal transmission line. Coupler 35 consists of a plurality of optical signal coupling and mixing elements disposed within an enclosure 39. Station 36 includes a receiver 41 and a transmitter 42 which are connected to coupler 35 by transmission lines 43 and 44, respectively.

The end of transmission line section 37 is disposed adjacent to a first endface of an elongated transparent mixer rod 45 and the end of transmission line section 38 is disposed adjacent to a first endface of elongated transparent mixer rod 46. Rods 45 and 46 are preferably in the shape of a cylinder of circular cross-section, but other suitable cross-sectional shapes may be employed. Opposite ends of a waveguide bundle 52 are disposed adjacent to the second endfaces of mixer rods 45 and 46. A plurality of the waveguide fibers of bundle 52 are severed thereby forming two small waveguide bundles 53 and 54. The remaining ends of waveguide bundles 53 and 54 are disposed adjacent to the small endfaces of tapered rods 48 and 56, respectively. Rods 45, 46, 48 and 56 are formed of transparent material, the refractive index of which is preferably the same as that of the cores of the optical waveguide employed in the optical signal transmission lines with which the coupler 35 is associated. As used herein the term "transparent" indicates transparency to those wavelengths of light transmitted by the optical signal transmission lines.

If optical waveguides such as those disclosed in the aforementioned U.S. Pat. No. 3,659,915 were utilized in the optical signal transmission lines, rods 45, 46, 48 and 56 would preferably consist of doped fused silica or some other glass having a similar refractive index. The outer surfaces of rods 45, 46, 48 and 56 should cooperate with the surrounding medium to provide an optical quality interface for reflecting back into those rods any light that is incident thereon. Such interfaces are preferably provided by layers 49, 50, 51 and 57 of transparent cladding material having a refractive index sufficiently lower than that of rods 45, 46, 48 and 56, respectively. The light reflecting interface could also be provided by polishing the surfaces of the rods and utilizing air as the low index surrounding medium or by disposing on the surfaces of the rods a dielectric or metallic layer which is reflective to the wavelengths of light transmitted by the optical signal transmission lines. The endfaces of the rods are preferably polished and are substantially perpendicular to the longitudinal axes thereof.

Support means 58 maintains transmission line section 37 in alignment with rod 45 so that the ends of the individual waveguides of transmission line 37 are disposed within a region defined by the circumference of the adjacent endface of rod 45, thereby causing light emitted by each of those waveguides to be incident upon that endface. Support means 58 also maintains the longitudinal axis of each waveguide in transmission line 37 substantially parallel to the axis of rod 45. The output end of rod 45 is provided with support means 59 which positions the waveguides of bundle 52 with respect to endface of rod 35 and aligns the axes of those waveguides with that of rod 45, thereby enabling the efficient coupling of light from rod 45 to bundle 52. Support means 61 and 62, which are disposed adjacent to the ends of rod 46, function in a manner similar to support means 58 and 59, respectively. Support means 63 and 64 function in a manner similar to support means 58 and thereby maintain transmission lines 43 and 44, respectively, in proper alignment with respect to the large endfaces of rods 48 and 56, respectively. Support means 65 and 66 maintain the ends of bundles 53 and 54 in proper alignment with respect to the small endfaces of rods 48 and 56, respectively. A layer of index matching fluid may be disposed between adjacent optical elements such as the transmission lines or fiber bundles and the adjacent rod endfaces to reduce Fresnel reflections.

The same optical signal is initially propagated in all of the optical waveguides of transmission line 37 in order to transmit a sufficient amount of optical energy and to provide redundancy in the event that some of the individual waveguide fibers break. Since the optical signal may not be propagating in all of the optical waveguides at that end of transmission lines 37 which is disposed adjacent to rod 45, that rod must function to mix the optical signals radiating therein from section 37 and provide a substantially uniform illumination of the individual waveguides of bundles 52 and 53. If the optical signal transmission lines 37, 38, 43 and 44 are equal in size and bundles 53 and 54 are smaller in diameter, means must be provided for coupling optical signals between bundles 53 and 54 and transmission lines 43 and 44, respectively. This function is performed by tapered rods 48 and 56. A fraction of the optical signal propagating in transmission line 37 is thus coupled to receiver 41 by fiber bundle 53, tapered rod 48 and transmission line 43. That portion of the optical signal which is not extracted by fiber bundle 53 is coupled by fiber bundle 52 and mixing rod 46 to transmission line 38. An optical signal generated at transmitter 42 is coupled by transmission line 44, tapered rod 56 and fiber bundle 54 to mixing rod 46, which functions to distribute in a uniform manner over the individual waveguides of transmission line 38 the optical signals propagating in fiber bundles 52 and 54. Thus, the throughput optical signal from transmission line 37 and the input optical signal from transmitter 42 are mixed and are both propagated in all of the optical waveguides of transmission line 38.

Although the tapered rods 48 and 56 of FIG. 2 are probably the most rugged means for interconnecting two waveguide bundles of different diameters, other optical coupling means could be utilized. In FIG. 3, wherein elements similar to those of FIG. 2 are represented by primed reference numerals, the coupling function is performed by a lens system schematically represented by lenses 67 and 68. In this embodiment light radiating from transmission line 44' is focused by the lens system onto the end of fiber bundle 54'.

Another modification of the preferred embodiment is illustrated in FIG. 4 wherein elements similar to those of FIG. 2 are represented by primed reference numerals. In this embodiment the function of mixer rods 45 and 46 and fiber bundles 52, 53 and 54 is accomplished with a single section 70 of transparent material such as glass or plastic. The refractive index of this material is not critical, but a refractive index equal to that of the cores of the waveguides fibers of transmission lines 37' and 38' would reduce Fresnel reflections. Section 70 could be provided with a layer of transparent cladding material having a refractive index lower than that of section 70, but in this embodiment the surrounding layer of air, which has a relatively low refractive index, is utilized as the low index cladding layer.

Section 70 comprises first and second end portions 71 and 72 which are joined by coupling portion 73. A first furcated portion 74 extends from end portion 71, curves away from coupling portion 73 and terminates at light detector 76. A second furcated portion 75 extends from end portion 72 toward end portion 71, curves away from coupling portion 73 and terminates at light emitting diode 77. Since portions 71 through 75 are a part of a unitarily constructed member, some of the optical interfaces, which are present in the embodiment of FIG. 2, are eliminated. FIG. 4 further illustrates that the light receiving and transmitting function can occur at the coupler rather than at a remotely located station as illustrated in FIG. 2. Thus, tapered rods 48 and 56 of FIG. 2 could be replaced by a light detector and emitter, respectively as illustrated in FIG. 5 wherein elements similar to those illustrated in FIG. 2 are represented by primed reference numerals. Also, the furcated portions 74 and 75 of FIG. 4 could be coupled to transmission lines by tapered rods or lens systems as illustrated in FIGS. 2 and 3.

I claim:

1. A passive optical coupler for use in an optical communication system including first and second optical signal transmission lines, said coupler comprising, first and second light mixers, each having an input portion for receiving light and an output portion across which light received by the input portion is relatively evenly distributed, the input portion of said first mixer being adapted to be connected to an end of said first transmission line, and the output portion of said second mixer being adapted to be connected to an end of said second transmission line, first coupling means for coupling most of the light at the output portion of said first mixer to the input portion of said second mixer, the remaining light available at the output portion of said first mixer constituting an output optical signal, output means for receiving said output optical signal, second coupling means disposed adjacent to the output portion of said first mixer for coupling said output optical signal to said output means, input means for providing an input optical signal, and third coupling means for coupling said input optical signal from said input means to the input portion of said second mixer.

2. A coupler in accordance with claim 1 wherein said first and second mixers comprise first and second elongated transparent rods, the input and output portion of each rod consisting of planar endfaces that are perpendicular to the axis thereof, and wherein said first coupling means comprises a first bundle of optical waveguide fibers connected between the output endface of said first rod and the input endface of said second rod.

3. A coupler in accordance with claim 2 wherein said second and third coupling means comprise second and third bundles of optical waveguide fibers, respectively, a first end of said second bundle being disposed adjacent to the output endface of said first elongated rod, a second end of said second bundle being coupled to said output means, a first end of said third bundle being disposed adjacent to said input means and a second end of said third bundle being disposed adjacent to said input endface of said second elongated rod.

4. A coupler in accordance with claim 3 wherein said output means is a light detector disposed adjacent to said second end of said second bundle, and said input means is a light source disposed adjacent to said first end of said third bundle.

5. A coupler in accordance with claim 3 further comprising first and second tapered rods having endfaces substantially perpendicular to the axes thereof, said small endface of said first tapered rod being disposed adjacent to said second end of said second bundle, said small endface of said second tapered rod being disposed adjacent to said first end of said third bundle, a third optical signal transmission line coupled to the large endface of said first tapered rod and a fourth optical signal transmission line coupled to the large endface of said second tapered rod.

6. A coupler in accordance with claim 1 wherein said first and second mixers and said first, second and third coupling means comprise an elongated transparent member having first and second opposed end portions respectively terminating in planar input and output endfaces which are perpendicular to the axis of said elongated member, the cross-sectional area of said first and second end portions approximating the cross-sectional area of said first and second sections of transmission line, said input endface being disposed adjacent to an end of said first section of transmission line and said output endface being disposed adjacent to an end of said second section of transmission line, the cross-sectional area of the central portion of said elongated member being less than that of said first and second end portions, first and second elongated furcated portions extending from that part of said first and second end portions, respectively, opposite said endfaces, said furcated portions curving away from the central portion of said elongated member, the end of said first furcated portion remote from said first end portion being coupled to said output means, and the end of said second furcated portion remote from said second end portion being coupled to said input means.

7. A passive optical coupler for use in an optical communication system including first and second optical signal transmission lines, said coupler comprising, first and second light mixers, each having an input portion for receiving light and an output portion across which light received by the input portion is relatively evenly distributed, the input portion of said first mixer being adapted to be connected to an end of said first transmission line, and the output portion of said second mixer being adapted to be connected to an end of said second transmission line, third optical signal transmission line coupling means for coupling the light at the output portion of said first mixer to the input portion of said second mixer, the remaining light available at the output portion of said first mixer constituting an output optical signal, fourth optical signal transmission line coupling means disposed adjacent to the output portion of said first mixer for coupling said output optical signal from said mixer, and fifth optical signal transmission line coupling means for coupling an input optical signal to the input portion of said second mixer.

* * * * *